Sept. 27, 1932.  VAN ALVIN HAMILTON  1,879,981
DRAWBAR FOR TRAILERS
Filed March 21, 1932    2 Sheets-Sheet 1
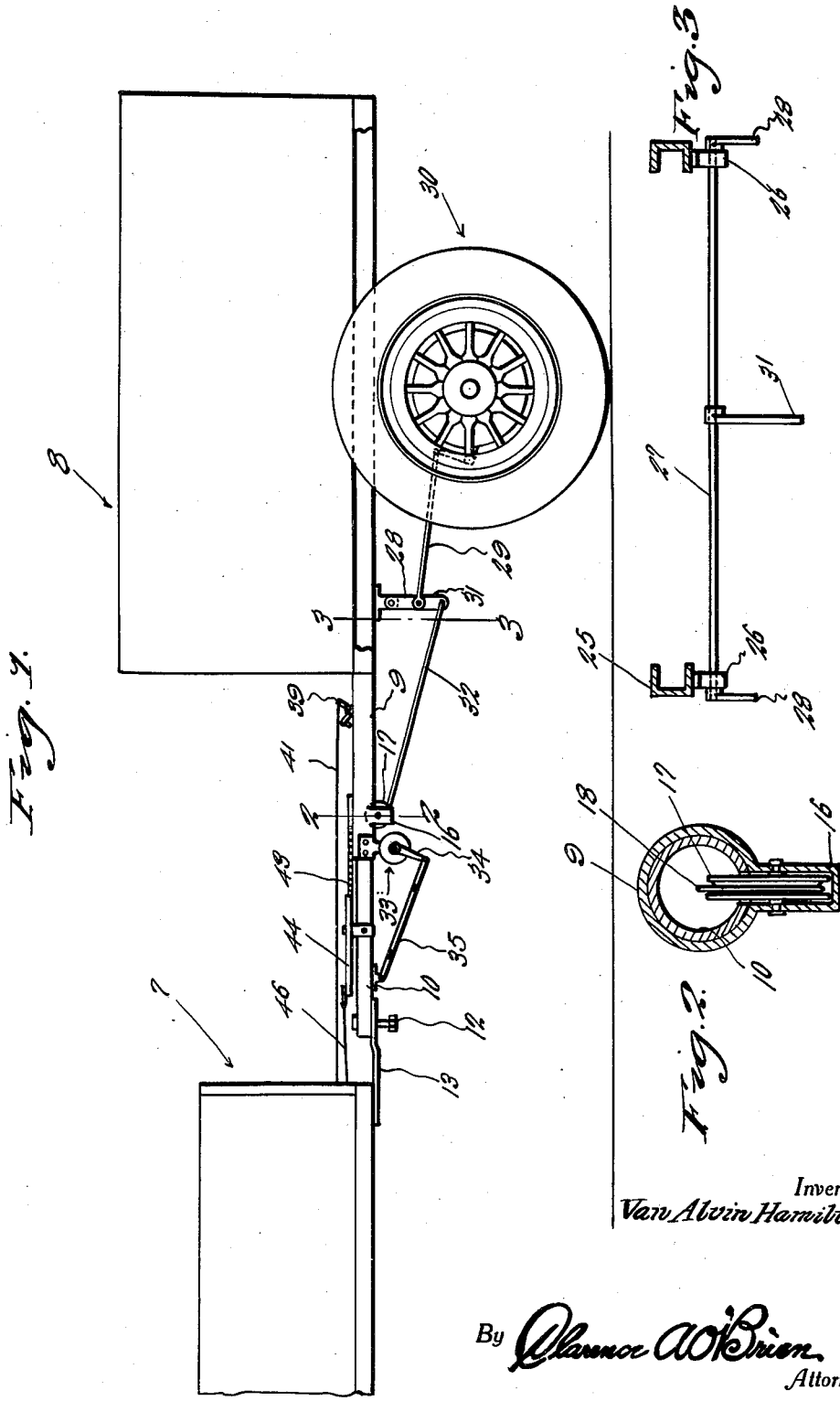
Inventor
Van Alvin Hamilton
By Clarence A. O'Brien
Attorney Sept. 27, 1932.  VAN ALVIN HAMILTON  1,879,981
DRAWBAR FOR TRAILERS
Filed March 21, 1932  2 Sheets-Sheet 2
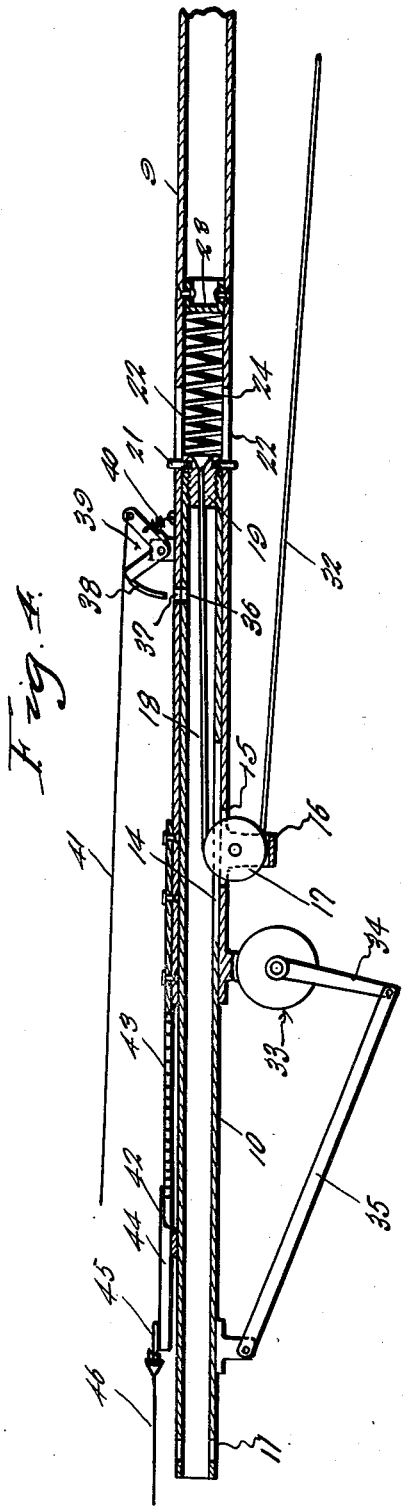
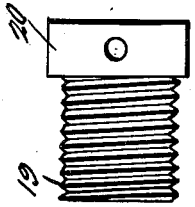
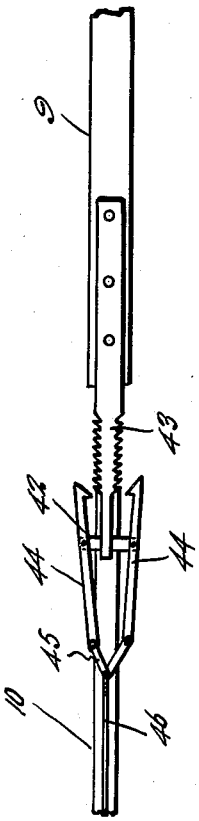
Inventor
Van Alvin Hamilton
By Clarence A. O'Brien
Attorney Patented Sept. 27, 1932

1,879,981

UNITED STATES PATENT OFFICE

VAN ALVIN HAMILTON, OF PALESTINE, TEXAS

DRAWBAR FOR TRAILERS

Application filed March 21, 1932. Serial No. 600,320.

This invention relates to an improved draft connection between a lead or power vehicle and a trailer, said connection being in the form of an improved draw bar embodying novel trailer brake operating means and allied appurtenances for co-operation therewith.

In carrying the inventive conception into actual practice, I have expressly selected intimately co-acting parts successfully incorporated in a complete structural assembly forming adequate and practical means calculated to better fulfill the requirements of a draw bar connection between the trailer and power vehicle.

One structural feature of the invention is predicated on the adoption and use of a pair of companion telescopically connected draw bar sections or members having the automatic trailer brake operating means associated therewith in a simplified and dependable manner for efficient operation.

A further feature of the invention is the provision of means for holding said members in relatively set positions to facilitate reversing of the trailer without affecting the actuation of the trailer brake.

A further feature of the invention is based on the adoption and use in the structure of manually controlled pawl and rack means for temporarily holding the sections of the draw bar in a position to maintain the trailer brake in a set position whenever necessary or desired.

An equally important feature is found in the novel adaptation of a hydraulic shock absorber or equivalent snubbing device in the general arrangement to insure smooth and positive operation of the mechanism.

Referring now to the figures of the accompanying illustrative drawings, it will be observed that:

Figure 1 is a side elevational view showing the complete structural organization as developed and constructed in accordance with the present invention.

Figure 2 is a detail cross section on the line 2—2 of Figure 1.

Figure 3 is a similar section on the line 3—3 of Figure 1.

Figure 4 is a longitudinal sectional and elevational view disclosing the explicit selection and organization of parts constituting the principal novelty of the invention.

Figure 5 is a top plan view of the pawl and ratchet brake retaining means.

Figure 6 is a detail view.

In Figure 1 the power of lead vehicle is generally designated by the numeral 7 and the trailer denoted by the numeral 8. Attached to the underside of the central portion of the trailer body is a tubular draft tongue 9 which constitutes the relatively fixed section or member of the draft bar. The companion member is distinguished by the numeral 10 and is also in the form of a tube of smaller diameter fitted telescopically in the main tube 9 as illustrated in Figure 4.

At its forward end, the tube 10 is provided with slots 11 to accommodate a coupling pin 12 carried by the connecting bar 13 attached to the rear end portion of the power vehicle 7. This provides the desired flexible draft connection between the draw bar and the power vehicle.

Intermediate its ends, the tube 10 is provided with a slot 14 in registration with a somewhat shorter slot 15 in the tube 9. At this point the tube 9 is provided with a sheave bracket 16 fixedly mounted and carrying a guide pulley or sheave 17 which protrudes through both slots as seen in Figure 4. This pulley is adapted to accommodate one end portion 18 of a flexible brake operating cable which end of the cable extends through the tube 10 and is attached to a threaded anchoring plug 19 carried by the inner end of said tube 10.

The headed end 20 of the plug is constructed to accommodate a guide pin 21 whose end portions extend through and are slidable in longitudinal slots 22 provided in the adjacent portion of the main tube 9. Mounted in the side of this tube 9 adjacent the slot is an abutment 23 against which a coiled cushioning spring 24 bears. The opposite end of the spring bears against the head of the plug 19.

At this time I call attention to Figure 3, wherein it will be observed that the frame of the trailer indicated at 25 is provided with brackets 26 in which an equalizing rocker shaft 27 is mounted for oscillation. The rocker arm 28 at opposite ends thereof serves to accommodate brake rods 29 which lead rearwardly and have operating connection with the brake on the trailer wheels 30.

The central actuating crank arm 31 of the rocker shaft serves to accommodate the end portion 32 of the brake applying cable.

As before intimated, the numeral 33 designates an appropriate hydraulic shock absorber carried by the forward end portion of the stationary tube 9, this having operating connection with the tube 10 through the medium of the crank arm 34 and link 35. Obviously, this particular part of the structure serves as a shock absorber designed to insure steady and smooth telescoping action of the tubular sections 9 and 10 of the draw bar as the trailer rides, under the action of momentum, toward the power vehicle when said vehicle is stopped.

Thus this shock absorber acts in conjunction with the spring means 24 to provide the requisite resilient properties for insuring gradual application of the trailer brakes without undue vibration and jar. In Figure 4, I call attention to the numerals 36 and 37 which designate apertures capable of being brought into alignment with one another to receive the retaining hook 38 of a bellcrank fixture 39 pivoted on the frontal portion of the tube 9. Incidently the numeral 40 designates a return spring for the bellcrank. Moreover, the bellcrank is provided with a pull cord or cable 41 which has its operating end located within convenient reach of the driver of the power car so that the hook 38 may be projected through the holes 36 and 37 to temporarily couple the tubes 9 and 10 together so that it is possible to utilize the draw bar as a unit without affecting the application of the brake while reversing the movement of the power car and trailer simultaneously.

In Figure 5, the numeral 43 designates a toothed rack bar fixedly mounted on the end portion of the tube 9 and projecting therebeyond and overlying the tube 10. Attached by a bracket 42 to said tube 10 are normally opened pivotally mounted pawls 44 whose hooked ends are arranged to engage the teeth on opposite longitudinal edges of the rack bar 43. The pawls are actuated by complemental links 45 which are in turn controlled by a flexible cable 46 which leads into the power vehicle and is actuated by a lever (not shown) or equivalent device.

The pawl and ratchet mechanism obviously is a temporary means for holding the tubes 9 and 10 in any predetermined extensible position so as to permit the trailer brake to be held applied momentarily when occasion requires such operation.

In actual practice it is obvious that the draw bar and its automatically operating trailer brake means is attached to the body of the trailer while the relatively slidable tubular section thereof is coupled by the connecting bar 13 and pin 12 in a flexible manner to the rear end of the power vehicle. Obviously then, when the power vehicle is brought to a stop or slowed down, the momentum of the trailer causes the tube 9 to slide longitudinally along the tube 10 carrying with it the pulley 17.

The pulley 17 acts on the flexible cable portions 18 and 32 to rock the shaft 27 and to apply the trailer brake by way of the brake rod 29. It is obvious of course that the bell crank 39 is utilized for temporarily coupling the tubes 9 and 10 together to provide a rigid unit capable of reversing the trailer with the power car without affecting the operation of the trailer brake, and likewise the trailer brake may be temporarily held in complete set or partly set position through the medium of the pawl and ratchet mechanism both the ratchet mechanism and bellcrank 39 being controlled by individual cables arranges in convenient reach of the operator of the power vehicle.

It is evident too, that the spring shock absorbing means 24 together with the hydraulic snubbing and shock absorbing means 33 cooperate in producing the requisite smooth and positive application of trailer brakes under the steady smooth telescoping action of the tubes 9 and 10.

It is thought that the description taken in connection with the drawings will enable a clear understanding of the invention to be had. Therefore, a more lengthy description is thought unnecessary. While the preferred embodiment of the invention has been shown and described, it is to be understood that minor changes coming within the field of invention claimed may be resorted to if desired.

I claim:

1. In a structure of the class described, a draw bar adapted for attachment to a trailer and comprising a stationary tube, a companion tube slidable therein, said tube having alined slots, a sheave fixedly attached to the first-named tube and extending through said slots, a trailer brake applying cable trained over said sheave and having one end portion extending into and through the movable tube, and attached to the inner end of said tube, the opposite end of the cable being adapted for attachment to the trailer brake operating means, the forward free end portion of said slidable tube being apertured to accommodate a coupling pin carried by the power vehicle, a shock absorbing device carried by the first-named tube, and an operating link connection between the shock absorbing device and slidable tube.

2. In a structure of the class described, a draw bar adapted for attachment to a trailer and comprising a stationary tube, a companion tube slidable therein, said tube having alined slots, a sheave fixedly attached to the first-named tube and extending through said slots, a trailer brake applying cable trained over said sheave and having one end portion extending into and through the movable tube, and attached to the inner end of said tube, the opposite end of the cable being adapted for attachment to the trailer brake operating means, the forward free end portion of said slidable tube being apertured to accommodate a coupling pin carried by the power vehicle, a shock absorbing device carried by the first-named tube, and an operating link connection between the shock absorbing device and slidable tube, a coil spring arranged in said first-named tube and bearing against the adjacent end of the slidable tube.

3. A trailer draw bar and automatic brake operating means comprising a draw bar embodying a relatively stationary main tube having a longitudinal slot formed at its free end and diametrically opposite elongated slots formed in its intermediate portion, a companion relatively movable tube mounted for longitudinal reciprocation in said main tube and having a slot intermediate its ends co-operable with the first named slot of the main tube, a plug threaded into the inner end of the slidable tube and provided with guide pins extending outwardly through the diametrically opposite slots in the main tube, a sheave fixedly carried by the main tube and extending through the adjacent slots in said tube and slidable tube, a brake operating cable attached to said plug and extending through said last-named slots and trained over said sheave.

4. A trailer draw bar and automatic brake operating means comprising a draw bar embodying a relatively stationary main tube having a longitudinal slot formed at its free end and diametrically opposite elongated slots formed in its intermediate portion, a companion relatively movable tube mounted for longitudinal reciprocation in said main tube and having a slot intermediate its ends co-operable with the first-named slot of the main tube, a plug threaded into the inner end of the slidable tube and provided with guide pins extending outwardly through the diametrically opposite slots in the main tube, a sheave fixedly carried by the main tube and extending through the adjacent slots in said tube and slidable tube, a brake operating cable attached to said plug and extending through said last-named slots and trained over said sheave, both of said tubes having apertures adapted to be alined with each other when the tubes are in the predetermined relationship, a bellcrank pivotally mounted on the main tube and having a hooked locking finger projectable through said apertures to hold said tube in relatively fixed relationship for the purpose described, together with an operating cable for said bellcrank.

5. A trailer draw bar and automatic brake operating means comprising a draw bar embodying a relatively stationary main tube having a longitudinal slot formed at its free end and diametrically opposite elongated slots formed in its intermediate portion, a companion relatively movable tube mounted for longitudinal reciprocation in said main tube and having a slot intermediate its ends co-operable with the first-named slot of the main tube, a plug threaded into the inner end of the slidable tube and provided with guide pins extending outwardly through the diametrically opposite slots in the main tube, a sheave fixedly carried by the main tube and extending through the adjacent slot in said tube and slidable tube, a brake operating cable attached to said plug and extending through said last-named slots and trained over said sheaves, both of said tubes having apertures adapted to be alined with each other when the tubes are in the predetermined relationship, a bellcrank pivotally mounted on the main tube and having a hooked locking finger projectable through said apertures to hold said tube in relatively fixed relationship for the purpose described, together with an operating cable for said bellcrank, and a fixedly mounted rack bar carried by the main tube, pivotally mounted co-operating pawls carried by the slidable tube and engageable with the teeth of the rack bar, and operating means for said pawls.

In testimony whereof I affix my signature.

VAN ALVIN HAMILTON.